(12) United States Patent
Savary et al.

(10) Patent No.: US 9,677,505 B2
(45) Date of Patent: Jun. 13, 2017

(54) METHOD FOR INJECTING FUEL INTO A COMBUSTION CHAMBER OF A GAS TURBINE, AND INJECTION SYSTEM FOR IMPLEMENTING SAME

(75) Inventors: Nicolas Savary, Jurancon (FR); Claude Berat, Igon (FR); Hubert Hippolyte Vignau, Nay (FR); Christophe Nicolas Henri Viguier, Arros de Nay (FR)

(73) Assignee: TURBOMECA, Bordes (FR)

( * ) Notice: Subject to any disclaimer, the term of this patent is extended or adjusted under 35 U.S.C. 154(b) by 646 days.

(21) Appl. No.: 14/126,672

(22) PCT Filed: Jun. 19, 2012

(86) PCT No.: PCT/FR2012/051368
§ 371 (c)(1),
(2), (4) Date: Dec. 16, 2013

(87) PCT Pub. No.: WO2012/175856
PCT Pub. Date: Dec. 27, 2012

(65) Prior Publication Data
US 2014/0116384 A1    May 1, 2014

(30) Foreign Application Priority Data
Jun. 20, 2011    (FR) ..................... 11 55371

(51) Int. Cl.
*F23R 3/60* (2006.01)
*F02M 7/00* (2006.01)
(Continued)

(52) U.S. Cl.
CPC ............... *F02M 7/00* (2013.01); *F02C 7/20* (2013.01); *F23M 20/005* (2015.01); *F23R 3/14* (2013.01);
(Continued)

(58) Field of Classification Search
CPC .. F23R 3/14; F23R 3/286; F23R 2900/00014; F23R 3/60; F23C 7/004; F23D 2210/00;
(Continued)

(56) References Cited

U.S. PATENT DOCUMENTS 4,111,369 A * 9/1978 Sharpe .................. F23D 11/107
239/400
4,201,047 A * 5/1980 Warren ..................... F23R 3/34
60/39.281

(Continued)

FOREIGN PATENT DOCUMENTS

EP    1 030 112 A1    8/2000
EP    1 801 503 A2    6/2007
(Continued)

OTHER PUBLICATIONS

International Search Report issued Sep. 6, 2012, in PCT/FR12/051368 filed Jun. 19, 2012.

*Primary Examiner* — Pascal M Bui Pho
*Assistant Examiner* — Marc Amar
(74) *Attorney, Agent, or Firm* — Oblon, McClelland, Maier & Neustadt, L.L.P.

(57) ABSTRACT

An air/fuel mixer system of a combustion chamber of a gas turbine includes at least one compressed air intake swirler, the swirler having a central axis of symmetry, and a fuel injector including an injection head having an axis of symmetry. Each injector is mounted in the corresponding swirler with aid of a guide mechanism, so that the axis of symmetry of the injection head is off-center with respect to the central axis of symmetry of the swirler. The system can reduce, or even eliminate, combustion instabilities, by injecting the fuel along a particular axis which is off-center (Continued)

relative to the axis of the air/fuel mixer system, inducing a flow of fuel which is no longer perfectly axially symmetrical.

7 Claims, 2 Drawing Sheets

(51) Int. Cl.
| | |
|---|---|
| F23R 3/28 | (2006.01) |
| F02C 7/20 | (2006.01) |
| F23R 3/14 | (2006.01) |
| F23M 20/00 | (2014.01) |

(52) U.S. Cl.
CPC .............. *F23R 3/283* (2013.01); *F23R 3/286* (2013.01); *F23R 3/60* (2013.01); *F23R 2900/00013* (2013.01); *F23R 2900/00014* (2013.01)

(58) Field of Classification Search
CPC ........ F02C 7/24; F02C 7/20; F05B 2260/966; F05B 2260/96; F05D 2250/312; F05D 2250/314
USPC .......................................................... 60/796
See application file for complete search history.

(56) References Cited

U.S. PATENT DOCUMENTS

| | | | | |
|---|---|---|---|---|
| 5,265,411 | A * | 11/1993 | Belsom | F23R 3/60 |
| | | | | 292/283 |
| 5,267,442 | A * | 12/1993 | Clark | F23D 11/007 |
| | | | | 60/748 |
| 6,272,842 | B1 | 8/2001 | Dean | |
| 6,513,334 | B2 * | 2/2003 | Varney | F23C 6/047 |
| | | | | 60/725 |
| 7,836,699 | B2 * | 11/2010 | Graves | F23C 7/004 |
| | | | | 60/737 |
| 2007/0137212 | A1 | 6/2007 | Graves | |
| 2010/0293953 | A1 | 11/2010 | Wilbraham | |
| 2014/0318129 | A1 * | 10/2014 | Viitamaki | F23L 15/00 |
| | | | | 60/648 |

FOREIGN PATENT DOCUMENTS

| | | |
|---|---|---|
| FR | 2 948 749 | 2/2011 |
| GB | 2 454 247 | 5/2009 |

* cited by examiner

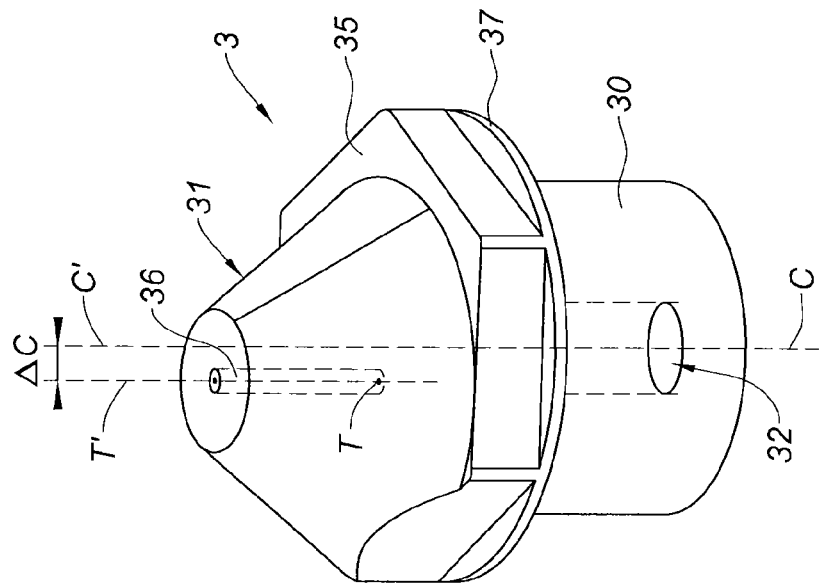
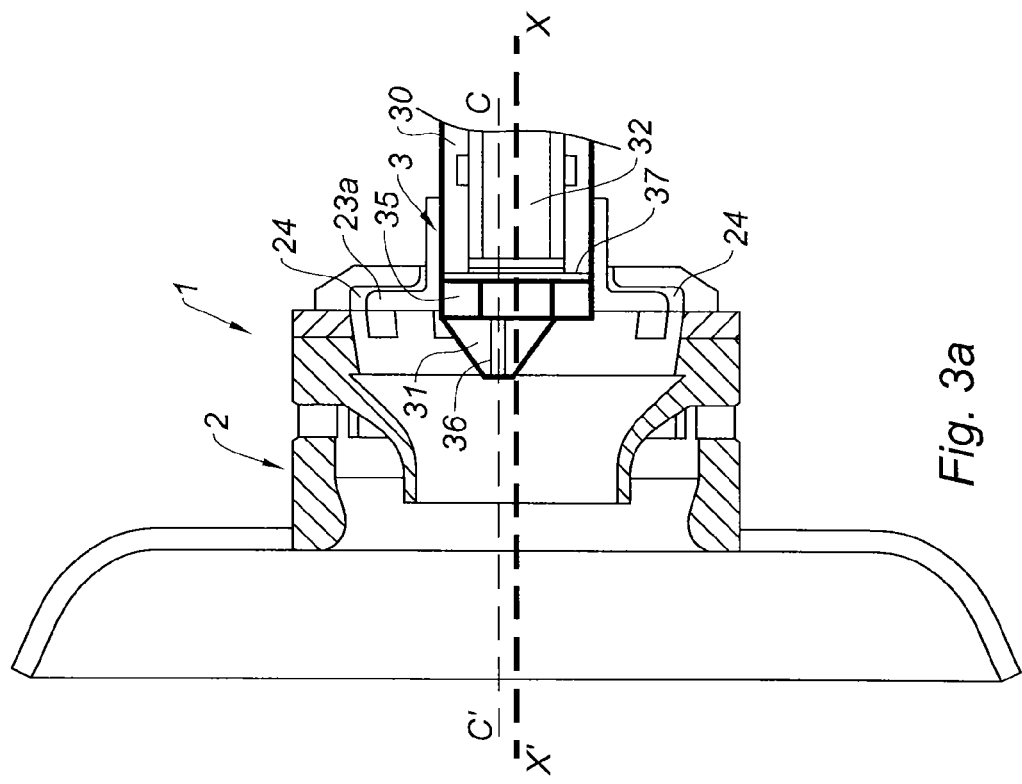

METHOD FOR INJECTING FUEL INTO A COMBUSTION CHAMBER OF A GAS TURBINE, AND INJECTION SYSTEM FOR IMPLEMENTING SAME

TECHNICAL FIELD

The invention relates to a method for injecting fuel into a combustion chamber of a gas turbine—turboshaft engine, turbojet engine or auxiliary power unit (APU)—in order to eliminate, or at least limit, the combustion instabilities. The invention also relates to an injection system suitable for carrying out the method.

In a combustion chamber of a gas turbine, such as a turboshaft engine, injectors mounted on a housing supplying fuel which is mixed with air inside air/fuel mixers, commonly known as swirlers, distributed over the base of the combustion chamber. The air originates from the last stage of a compressor of the gas turbine of which a part is introduced into the combustion chamber via this swirler. The fuel is introduced into the injector via an orifice formed at the end of a manifold. The air and the fuel are mixed in the swirlers then burnt in the chamber in order to generate gases. The heat energy of these gases is converted into mechanical work by means of turbines and/or into thrust via the nozzle, thus making it possible to ensure the propulsion of the aircraft or the supply of mechanical power for a terrestrial or marine installation.

When designing a turboshaft engine and in particular the combustion chamber thereof, a considerable risk, which cannot be removed before the first rotation of the engine, is the presence of combustion instabilities within the chamber in the operating range of the engine. These instabilities are produced when the fluctuations of combustion in the chamber resonate with physical phenomena located therein (natural mode of acoustic vibration, mechanical vibration, instability of fuel supply, etc.). These instabilities then generate vibrations which are referred to as asynchronous because they are not directly linked to the speed of rotation of the engine. When there is resonance between a natural acoustic mode and the fluctuations of heat release associated with the combustion, this is commonly referred to as thermo-acoustic coupling causing combustion instabilities.

More broadly, the combustion instabilities can induce vibrations which potentially destroy the structure of the chamber, or even of the engine, preventing the certification of the engine.

PRIOR ART

When the presence of combustion instabilities is apparent, a conventional solution consists of redesigning the combustion chamber and/or the injection system as a function of the impacts. This solution is costly and gives rise to substantial delays in development and therefore certification.

The patent document U.S. Pat. No. 4,831,700 discloses means for combatting the combustion instability of a turbine including an annular valve mounted on a shoulder of the injector. Thus an internal air chamber is created. The valve has a protruding head in order to control the flow of fuel from an orifice formed in the shoulder of the injector, close to the fuel outlet. Such an architecture is complex and based on a variation of opening of this valve, which can eliminate the interruptions or the pulses of fuel flow. However, if such means reduce the combustion instability associated with fuel flow irregularities they do not make it possible to solve this problem of combustion instabilities.

The patent document EP 1 413 830 also discloses a configuration based on an air divider with a conical end, located between the fuel injector and the air swirler. The divider separates the air stream into two concentric currents in order to create a two-way recirculation zone in the chamber. For the same reasons as given above, this solution does not eliminate the combustion instabilities.

DESCRIPTION OF THE INVENTION

The invention relates to reducing, or even eliminating, the combustion instabilities, by proposing injecting the fuel along a particular axis which induces a flow of fuel in the swirler which is no longer perfectly cyclically symmetrical.

More precisely, the present invention relates to a method for injecting fuel into a combustion chamber of a gas turbine, by an air/fuel mixer system having a cyclically symmetrical geometric axis. In this method, the injection of fuel is effected in the mixer system along an axis parallel to the central axis of this system in the strict sense, i.e. separate from this axis. It is then stated that the injection axis is off-centre relative to the axis of the mixer. Under these circumstances, in the absence of axially symmetrical spraying of fuel, the combustion flame no longer resonates, eliminating or reducing the combustion instabilities to an acceptable level.

According to particular embodiments:
- the combustion chamber, arranged in a housing, is angularly offset with respect to the housing, the injection of fuel being effected by an injector integral with the housing and the mixer system being joined to the combustion chamber; and/or
- the injection is off-centre in the mixer system: this mode is in particular implemented when the mixer system has one or more degrees of freedom on the combustion chamber.

The invention likewise relates to an air/fuel mixer system of the turbine combustion chamber equipped with a housing to protect the chamber, this system being suitable for implementing the above method. This system includes at least one compressed air intake swirler, the swirler having a central axis of symmetry, and a fuel injector equipped with an injection head, having its own axis of symmetry. Each injector is mounted in the corresponding swirler with the aid of guide means, in particular a flanged ferrule mounted in a retaining ring integral with the swirler, so that the axis of symmetry of the injection head is off-centre with respect to the central axis of symmetry of the swirler.

According to particular embodiments:
- means which render the swirlers integral with the chamber and which render the injector integral with the housing, and means for off-centre fixing of the chamber on the housing are capable of angularly offsetting the chamber in relation to the housing so that the injectors are offset axially relative to the corresponding swirlers;
- each injector has a principal axis of symmetry and an injection head having a central fuel circulation channel having an axis off-centre with respect to the principal axis of the swirler;
- the injection head, advantageously frustoconical, can be mounted off-centre relative to a main body of the injector, the axis of the channel of the head being the axis of symmetry of the injection head.

BRIEF DESCRIPTION OF THE DRAWINGS

Other characteristics and advantages of the present invention will become clearer by reading the following detailed embodiment, with reference to the appended drawings, in which, respectively:

FIGS. 3a and 3b are views in section and in perspective of another example of an eccentric fuel injector, respectively in the swirler and outside this system.

DETAILED DESCRIPTION

The terms "upstream" and "downstream" or equivalents designate parts of an element with reference to the flow of the fuel in the injector according to the axis C'C.

Figure 1:
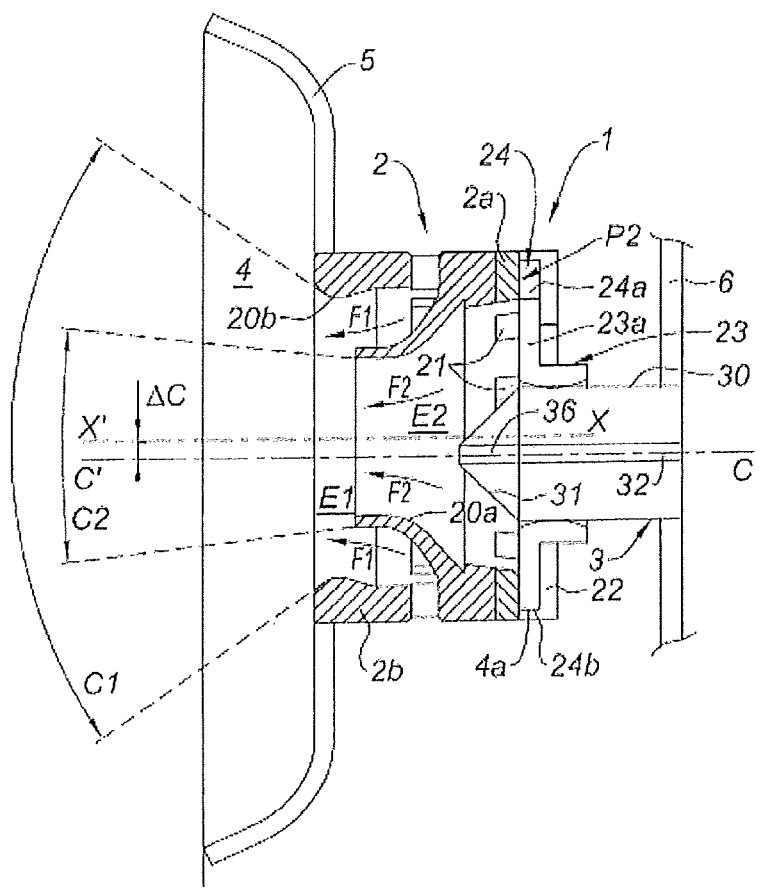
FIG. 1 is a sectional view of a first example of a mixer system according to the invention having an injector with a parallel axis and offset with respect to the axis of the associated swirler.

With reference to the sectional view of FIG. 1, an example of a mixer 2 according to the invention commonly referred to as a swirler provided with air inlet cells 21, and with a retaining ring 22. This ring makes it possible to accommodate a guide ferrule 23 with a flange 23a for a fuel injector 3. The swirler 2 is integral with the combustion chamber 4 through a flame tube 5. The injector 3 is fixed on the housing 6 which surrounds the combustion chamber 4.

The air inlet cells 21 are formed in an annular part 2a which is fitted coaxially, according to the axis X'X of the swirler 2 and of the mixer system 1, on a second annular part 2b. The first part 2a forms, within the swirler 2, a venturi wall 20a and the second part 2b forms another venturi wall 20b. The first venturi wall 20a penetrates the second 20b in such a way as to create an inter-venturi space E1 in which an air stream F1 originating from the cells 21 circulates. This flow forms at the outlet an air cone C1 which envelops the air/fuel mixture cone C2 formed by the internal venturi space E2 limited by the first venturi wall 20a.

In this space E2, the internal air stream F2 coming from the cells 21 is mixed with the fuel supplied by the injector 3. More precisely, the air swirlers form in the internal venturi E2 layers of air which overlap at the inlet of the combustion chamber 4. In each layer, the particles of air are mixed in a fluid and uniform manner with the particles of fuel sprayed by the injector 3, which produces an air/fuel mixture which performs well.

The internal air streams F1 and F2 can advantageously have, independently, a flow which is or is not swirling, in the same direction or in the contrary direction, in such a way as to obtain spraying of the fuel and/or the most effective air/fuel mixture possible, conforming to the performance requirements of the combustion chamber.

In the illustrated example, the fuel injector 3 has a cylindrical main body 30 with a frustoconical injection head 31. A fuel feed conduit 32 having an axis C'C merged with the axis of symmetry of the injector passes through the cylindrical body 30 and the injection head 31. In this embodiment the injection head 31 creates an injection moulding channel 36 in the extension of the conduit 32 of the injector body 30.

The mounting of the injector in the swirler 2 is achieved via the guide ferrule 23 of which the flange 23a is inserted in a radial groove 24 formed between the retaining ring 22 and the downstream wall P2 of the first annular part 2a. The ring 22 is joined, for example brazed, to the wall P2 in order to form the base 4a of the groove 24.

The flange 23a is positioned so that it is not axially symmetrical in the groove 24 in such a way that, when used hot, the unoccupied parts of the groove 24a and 24b are not of the same depth, so that the injector 3 itself is not positioned axially symmetrically in relation to the swirler 2. The fuel flow is no longer perfectly axially symmetrical since if the axes C'C and X'X respectively of the injector 3 and of the swirler 2 remain parallel they are not merged. Therefore they have a spacing $\Delta C$ of approximately 1 mm in the illustrated example. This spacing depends upon the dimensions of the engine.

Under these circumstances, in the absence of axially symmetrical spraying of fuel, the combustion flame no longer resonates; the combustion instabilities are eliminated or reduced to an acceptable level.

In the event that the swirler is integral with the chamber base, this mounting which is not axially symmetrical may be achieved by an eccentric offset of the fixings of the chamber 4 on the housing 6 with respect to a nominally aligned reference position. In the example of mounting which is illustrated schematically by the perspective view of FIG. 2, eccentric clips 10 are used for fixing the chamber 4 on the housing 6. These eccentric clips 10 make it possible to offset the chamber angularly by an offset $\Delta A$ of approximately several tenths of a degree, the precise value depending upon the dimensions of the engine relative to a nominal reference position.

Such a displacement induces an equivalent offset of the swirlers 2, integral with the chamber 4, and of the injectors 3, integral with the housing 6. It follows that the fuel flow axis C'C of the injectors 3 exhibits the spacing $\Delta C$ relative to the axis X'X of the swirlers 2 according to FIG. 1.

In another example illustrated in FIGS. 3a and 3b, the non-axially symmetrical mounting of an injector 3 in a swirler 2 (FIG. 1) may again be achieved by the off-centre position of the injection head 31 in relation to the main body 30 of the injector 3.

This solution is particularly well adapted when the swirler is not directly integral with the combustion chamber. In particular, in the event that the guide ferrule 23, guaranteeing degrees of freedom between the swirler and the injector, is offset on the interface between the swirler 2 and the chamber 4, the relative position of the axis C'C of the fuel injector 3 and the axis X'X of the swirler 2 is determined by the position of the axis of the guide ferrule 23, integral with the swirler 2.

With reference to FIG. 3a, this shows another embodiment illustrated with an off-centre position of the injection head 31 relative to the body 30 and to the mounting nut 35. It then appears that the axis C'C of the fuel flow channel 36 which passes through the head 31 is parallel to and offset relative to the axis of the conduit 32 of the injector body 30, merged with the axis X'X of the swirler 2.

Thus the axis displacement is obtained by the position of the injection head 31 in relation to the injector body 30, whilst the guide flange 23a is centred in the radial groove 24.

The perspective view of FIG. 3b shows the asymmetric implementation of the joining of the injection head 31 on the mounting nut 35 of the head on the body 30. The body 30 terminates in a circular flange 37 on which the nut 35 is fitted by internal screwing. FIG. 3 likewise shows the displacement $\Delta C$ of the axis T'T of the channel 36 of the injection head 31 and of the axis C'C of the conduit 32.

The invention is not limited to the embodiments described and represented. It is for example possible to use various types of swirler, for example swirlers with several rings of cells in contra-rotation, or injectors with a pyramid-shaped head or with a concave profile. The invention applies of course to mono-venturi swirlers, that is to say swirlers which are not equipped with a second venturi 20b associated with the air stream F1.

Figure 2:
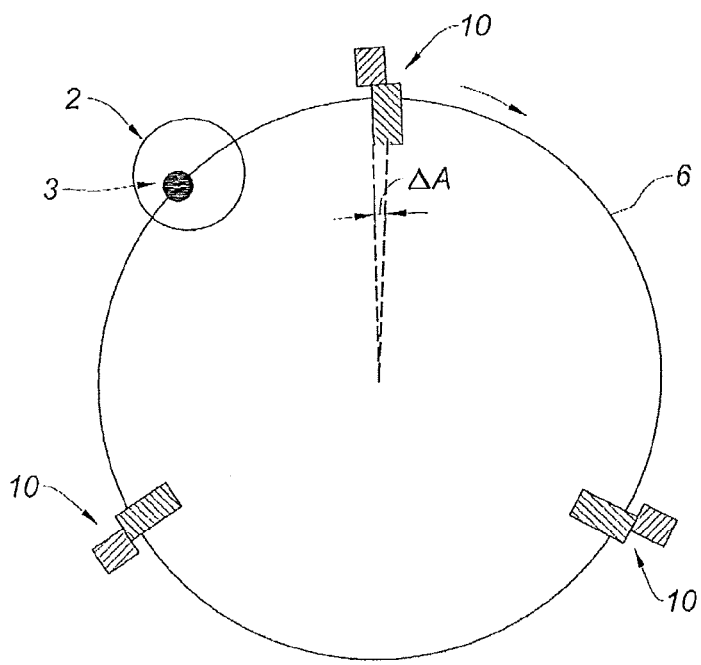
FIG. 2 is a schematic view of the combustion chamber protected by a housing and having means for eccentric fixing on the housing capable of angularly offsetting the chamber from the housing, in order to obtain the axis offset according to FIG. 1.

Likewise it is possible to combine a positioning which is not axially symmetrical of the guide ferrule and an off-centre injection head, for example by combining the embodiments of FIGS. 2 and 3a/3b. Moreover, according to another embodiment, it is possible to fix the ring 22 eccentrically by brazing so that, in use, the ferrule 23 is centred in the ring and thus is not axially symmetrical with respect to the axis of the swirler. Moreover, the swirler may not be fixed on the wall of the combustion chamber but for example on the housing. In addition, the guide means of the injector in the swirler may be formed by any known means, for example adjustable bearings, sockets, spacers, etc.

The invention claimed is:

1. A method for injecting fuel by an air/fuel mixer system having a central geometric axis of symmetry, in a combustion chamber of a gas turbine, the method comprising:
    injecting fuel in the air/fuel mixer system using a fuel injector having a fuel injector axis of symmetry parallel to the axis of symmetry of the air/fuel mixer system and separate from the axis of symmetry of the air/fuel mixer system,
    wherein the combustion chamber includes at least one of a first fixing having an axis and is arranged in a housing that includes at least one of a corresponding second fixing having an axis, and the at least one first and the at least one second corresponding fixings which attach the combustion chamber to the housing are angularly offset in relation to a nominal aligned reference position in which the combustion chamber and the housing are aligned thereby separating the fuel injector axis of symmetry and the axis of symmetry of the air/fuel mixer system when the axis of the at least one first fixing and the axis of at least one corresponding second fixing are angularly offset, and
    wherein the fuel injector is integral with the housing and the air/fuel mixer system is integral with the combustion chamber.

2. The method for injecting according to claim 1, wherein the fuel injector is offset in the mixer system, when the air/fuel mixer system is movable in one degree of freedom relative to the injector.

3. An air/fuel mixer system of a combustion chamber of a gas turbine including a housing for protection of the combustion chamber, comprising:
    a compressed air intake swirler the compressed air intake swirler having a central axis of symmetry; and
    a fuel injector including an injection head having a separate axis of symmetry,
    wherein the fuel injector is mounted in the compressed air intake swirler so that the axis of symmetry of the injection head is parallel to and offset with respect to the central axis of symmetry of the compressed air intake swirler, and
    wherein the combustion chamber includes at least one of a first fixing having an axis and is arranged in the housing, the housing including at least one of a corresponding second fixing having an axis, using the at least one first and the at least one second corresponding fixings to attach the combustion chamber to the housing, the at least one first and the at least one second corresponding fixings being angularly offset in relation to a nominal aligned reference position in which the combustion chamber and the housing are aligned so that a principal axis of symmetry of the fuel injector is offset from and parallel to the axis of symmetry of the compressed air intake swirler when the axis of the at least one first fixing and the axis of the at least one corresponding second fixing are angulary offset.

4. The air/fuel mixer system according to the claim 3, further comprising a ferrule with a flange mounted in a retaining ring integral with the compressed air intake swirler.

5. The air/fuel mixer system according to claim 3, wherein the compressed air intake swirler is integral with the combustion chamber and the fuel injector is integral with the housing.

6. The air/fuel mixer system according to claim 3, wherein the fuel injector has an injection head having a central fuel circulation channel having an axis offset with respect to the principal axis of the fuel injector.

7. The air/fuel mixer system according to claim 6, wherein the injection head is mounted offset relative to a main body of the fuel injector, an axis of the central fuel circulation channel of the head being the axis of symmetry of the injection head.

* * * * *